(12) United States Patent
Singh et al.

(10) Patent No.: US 6,420,903 B1
(45) Date of Patent: Jul. 16, 2002

(54) HIGH SPEED MULTIPLE-BIT FLIP-FLOP

(75) Inventors: Gajendra P. Singh, Sunnyvale; Joseph I. Chamdani, Santa Clara; Renu Raman, Los Altos, all of CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/638,338

(22) Filed: Aug. 14, 2000

(51) Int. Cl.$^7$ ............................................. H03K 19/00
(52) U.S. Cl. ............................. 326/93; 326/95; 326/98
(58) Field of Search ........................... 376/93–98, 113, 376/112, 119, 121

(56) References Cited

U.S. PATENT DOCUMENTS

| | | | | |
|---|---|---|---|---|
| 5,377,158 A | * | 12/1994 | Nishizawa | 365/233 |
| 5,424,654 A | | 6/1995 | Kaplinsky | 326/40 |
| 5,426,380 A | | 6/1995 | Rogers | 326/46 |
| 5,646,557 A | * | 7/1997 | Runyon et al. | 326/97 |
| 5,655,113 A | * | 8/1997 | Leung et al. | 395/552 |
| 6,211,713 B1 | * | 4/2001 | Uhlmann | 327/211 |

OTHER PUBLICATIONS

Omondi, A. R. et al.: "Performance of a context cache for a multithreaded pipeline" Journal of Systems Architecture, vol. 45, Dec. 1998, pp. 305–322.

Notification of Transmittal of the International Search Report or the Declaration and International Search Report, mailed Mar. 7, 2002; International Application No. PCT/US01/25553; filed Aug. 14, 2001; Applicant –Sun Microsystems, Inc.; 7 pages.

* cited by examiner

Primary Examiner—Michael Tokar
Assistant Examiner—Anh Tran
(74) Attorney, Agent, or Firm—Skjerven Morrill LLP

(57) ABSTRACT

A vertical multi-threading processor includes one or more execution pipelines that are formed from a plurality of multiple-bit pipeline register flip-flops. The multiple-bit pipeline register flip-flops supply multiple storage bits. The individual bits of a multiple-bit pipeline register flip-flop store data for one of respective multiple threads or processes. When an executing (first) process stalls due to a stall condition, for example a cache miss, an active bit of the multiple-bit register flip-flop is stalled, removed from activity on the pipeline, and a previously inactive bit becomes active for executing a previously inactive (second) process. All states of the stalled first process are preserved in a temporarily inactive bit of the individual multiple-bit register flip-flop in each pipeline stage.

29 Claims, 14 Drawing Sheets

HIGH SPEED MULTIPLE-BIT FLIP-FLOP

CROSS-REFERENCE

The present invention is related to subject matter disclosed in the following patent applications, which are incorporated by reference herein in their entirety:

U.S. patent application No. 09/638,236 entitled, "Pulse Based High-Speed Flop Circuit", naming Gajendra P. Singh and Joseph I. Chamdani as inventors and filed on even date herewith.

BACKGROUND OF THE INVENTION

Various techniques have been employed to increase computing performance and efficiency of a processor. For example, superscalar processors have been developed to achieve execution of multiple instructions at one time. Other techniques have also been employed to attain parallelism in operation, called multi-tasking, that increases processor performance. Multiple processors have been combined into a single system, each processor being capable of executing a particular sequence of instructions in a program or program segment. A program sequence of instructions is called a thread and the multiple processors execute a plurality of threads in a system with horizontal multi-threading.

An alternative multi-tasking technique is vertical threading, a promising way to enhance multi-tasking database performance of a processor. Vertical threading is a technique in which a single processing pathway is used by more than one program thread. A capacity for vertical threading exists because a program thread is not always actively executing. A program may be in a wait state awaiting either data or an event, such as a trap or interrupt. For example, some applications have frequent cache misses that result in heavy clock penalties. A most desirable condition is that a second process may utilize the processor while a first process is waiting for the arrival of data.

For example in data processing applications with frequent cache misses, data is accessed from a secondary storage structure, resulting in heavy clock penalties. During data accessing delays when a first process is idle, a beneficial usage of the idle pipeline would be to allow a second process to execute. The second process can take over the idle pipeline by saving all useful states of the first process in some location and assigning new states to the second process. When the second process becomes idle and the first process returns to processing, saved states are returned to the pipeline and the first process proceeds as usual. Vertical threading in this manner requires that states for the first process be saved in some location before beginning execution of the second process, and that states for the second process be saved in some location before returning to execution of the first process. The saving of states and switching between states is typically termed context switching.

Context switching using software techniques is time-expensive and does not enhance performance.

In one technique for vertical threading, multiple processes share a processor pipeline. To share the pipeline, all useful states of an inactive process must be saved during inactivity, and new states must be assigned upon process switching. Saving of the inactive process states requires duplication of storage structures. Assignment of new states requires switching logic. Unfortunately duplication of resources is costly in terms of integrated circuit space consumption and performance.

What is needed is a vertical multi-threading technique and structure that reduce the amount of additional resources for storing inactive states and switching between states.

SUMMARY

A vertical multi-threading processor includes one or more execution pipelines that are formed from a plurality of multiple-bit pipeline register flip-flops. The multiple-bit pipeline register flip-flops supply multiple storage bits. The individual bits of a multiple-bit pipeline register flip-flop store data for one of respective multiple threads or processes. When an executing (first) process stalls due to a stall condition, for example a cache miss, an active bit of the multiple-bit register flip-flop is stalled, removed from activity on the pipeline, and a previously inactive bit becomes active for executing a previously inactive (second) process. All states of the stalled first process are preserved in a temporarily inactive bit of the individual multiple-bit register flip-flop in each pipeline stage.

Vertical threading, a capability of switching among a plurality of separate processes when one of the processes is stalled, is attained by inserting a multiple-bit register flip-flop at sequential stages of a pipeline.

A multiple-bit register flip-flop is an integrated circuit device for synchronization of data in a data path and includes a driver and a plurality of storage elements coupled to the driver that drives data to the plurality of storage elements. The plurality of storage elements are coupled to the data path without delaying the data path.

According to one aspect of the processor, a pipeline register for synchronizing data in a data path includes a driver and a plurality of switched storage elements coupled to the driver. The driver is capable of driving a storage element selected by the switch while data in one or more storage elements that are not selected by the switch is held in the storage element. The plurality of storage elements are coupled to the data path without delaying the data path.

The pipeline register employs a method of operation including passing a time pulse, sampling data during the time pulse, and passing the data along a data path. The method further includes selecting a storage element from a plurality of storage elements, and storing the sampled data in a storage element connected to but outside the data path. The plurality of storage elements are capable of storing a respective plurality of execution thread.

In accordance with an aspect of usage of the integrated circuit device, a processor includes a control logic for executing computational and logic operations and a memory coupled to the control logic. The control logic and the memory include a plurality of flip-flops for synchronization of data in a data path. The flip-flops include a driver and a plurality of switched storage elements coupled to the driver. The driver is capable of driving a storage element selected by the switch, while data in one or more storage elements that are not selected by the switch are held in the storage element. The plurality of storage elements are coupled to the data path outside the data path.

BRIEF DESCRIPTION OF THE DRAWINGS

The features of the described embodiments believed to be novel are specifically set forth in the appended claims. However, embodiments of the invention relating to both structure and method of operation, may best be understood by referring to the following description and accompanying drawings.

FIG. 11A is a schematic block diagram illustrating control and storage blocks of a circuit employing high-speed multiple-bit flip-flops.

FIGS. 11B and 11C are schematic circuit diagrams that show multiple-bit bistable multivibrator (flip-flop) circuits.

FIG. 11D is a timing diagram illustrating timing of the multiple-bit flip-flop.

DESCRIPTION OF THE EMBODIMENTS

Figure 1:
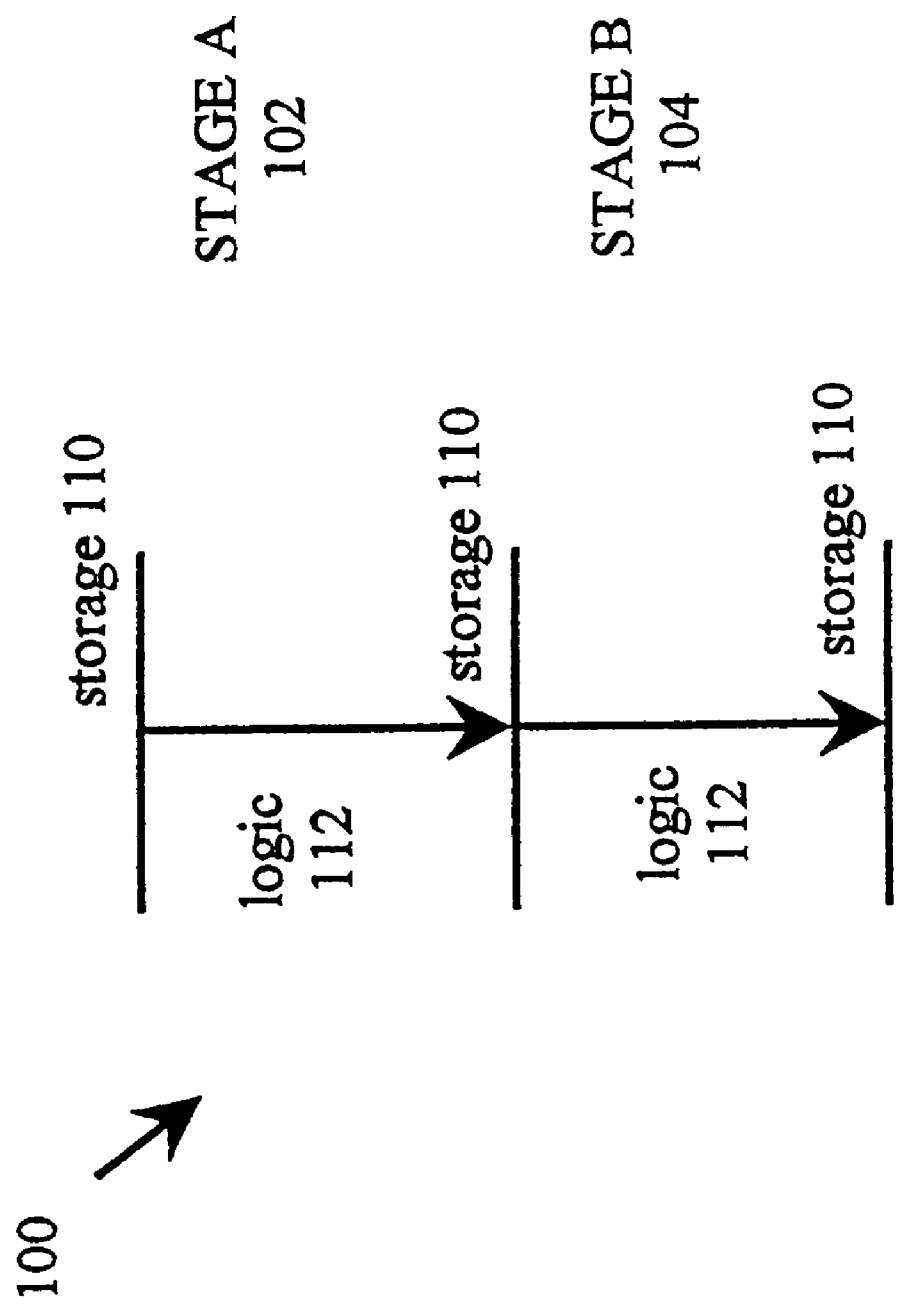
FIG. 1 is a schematic block diagram that illustrates a pipeline for a processor that utilizes multiple-bit register flip-flops.

Referring to FIG. 1, a pipeline 100 for a processor that utilizes multiple-bit register flip-flops to implement vertical multiple-threading. The pipeline 100 includes a plurality of stages, for example a stage A 102 and a stage B 104 in a sequence. The stages are timed elements that step through a sequence of processing operations. The individual stages include a data storage element 110 and computational logic 112 that operates on data stored in the individual stages as the data progresses from one stage to the next in sequence.

In the pipeline 100 that supports vertical multiple-threading, the data storage elements 110 are multiple-bit storage elements so that each stage of storage can store data for more than one process or thread. The data storage elements 110 typically include a plurality of bits in a first dimension that designate multiple-bit data blocks, words, or bytes for storing data operative in a single process or thread. The data storage elements 110 differ from conventional storage elements by also including multiple bits in another dimension, a thread dimension that differentiates among two or more execution threads, only one of which can be operative or active at one time. The computational logic 112 is shared for execution of the plurality of execution threads.

Figure 2:
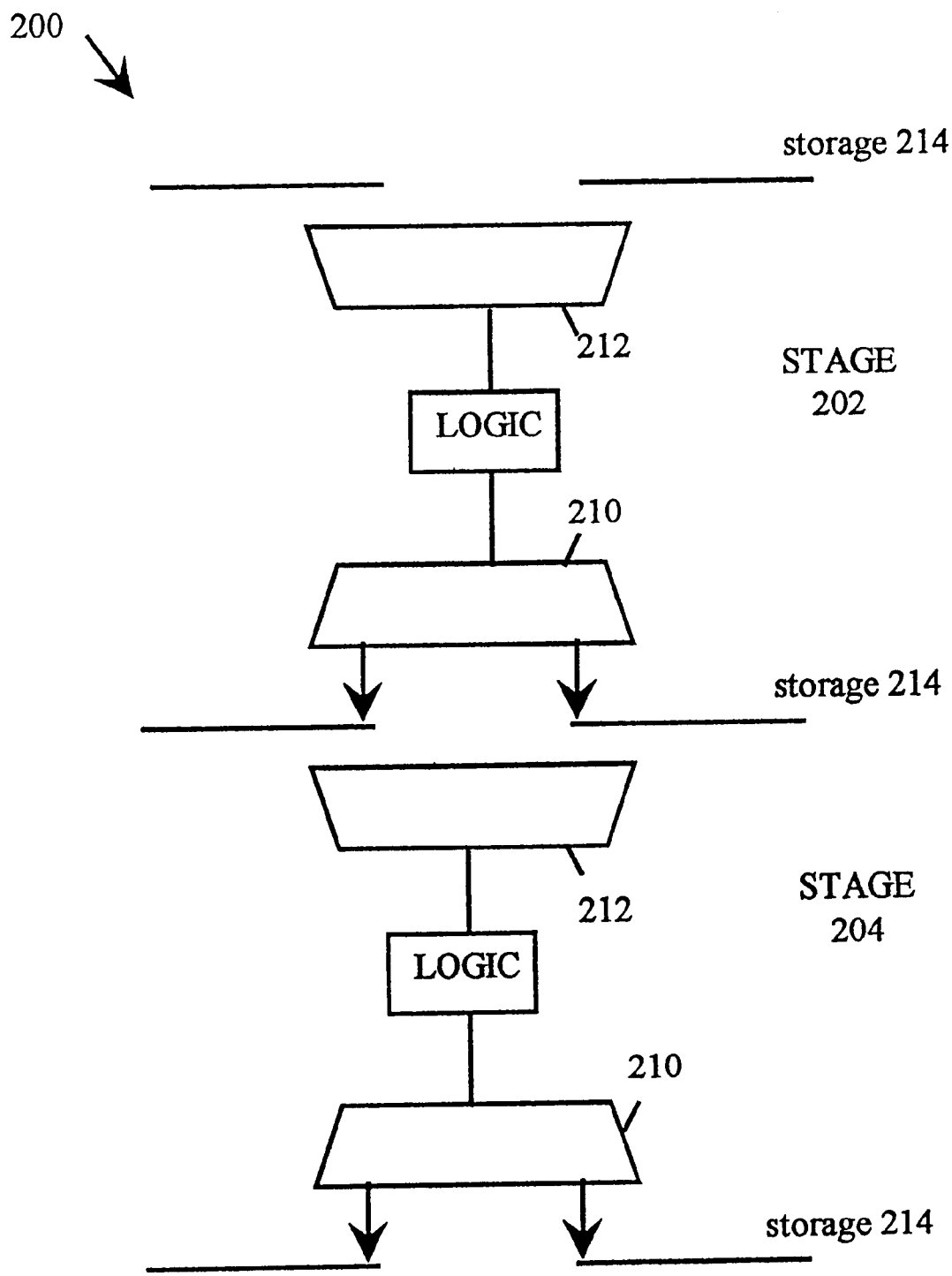
FIG. 2 is a conceptual schematic diagram illustrating a pipeline for a processor that utilizes multiple-bit register flip-flops to implement multiple threading.

Referring to FIG. 2, a pipeline 200 for a processor that utilizes multiple-bit register flip-flops to implement multiple-threading includes a plurality of stages, for example stages 202 and 204. The individual stages include a multiplexer 210, a demultiplexer 212, and the multiple-bit data storage elements 214.

Figure 3:
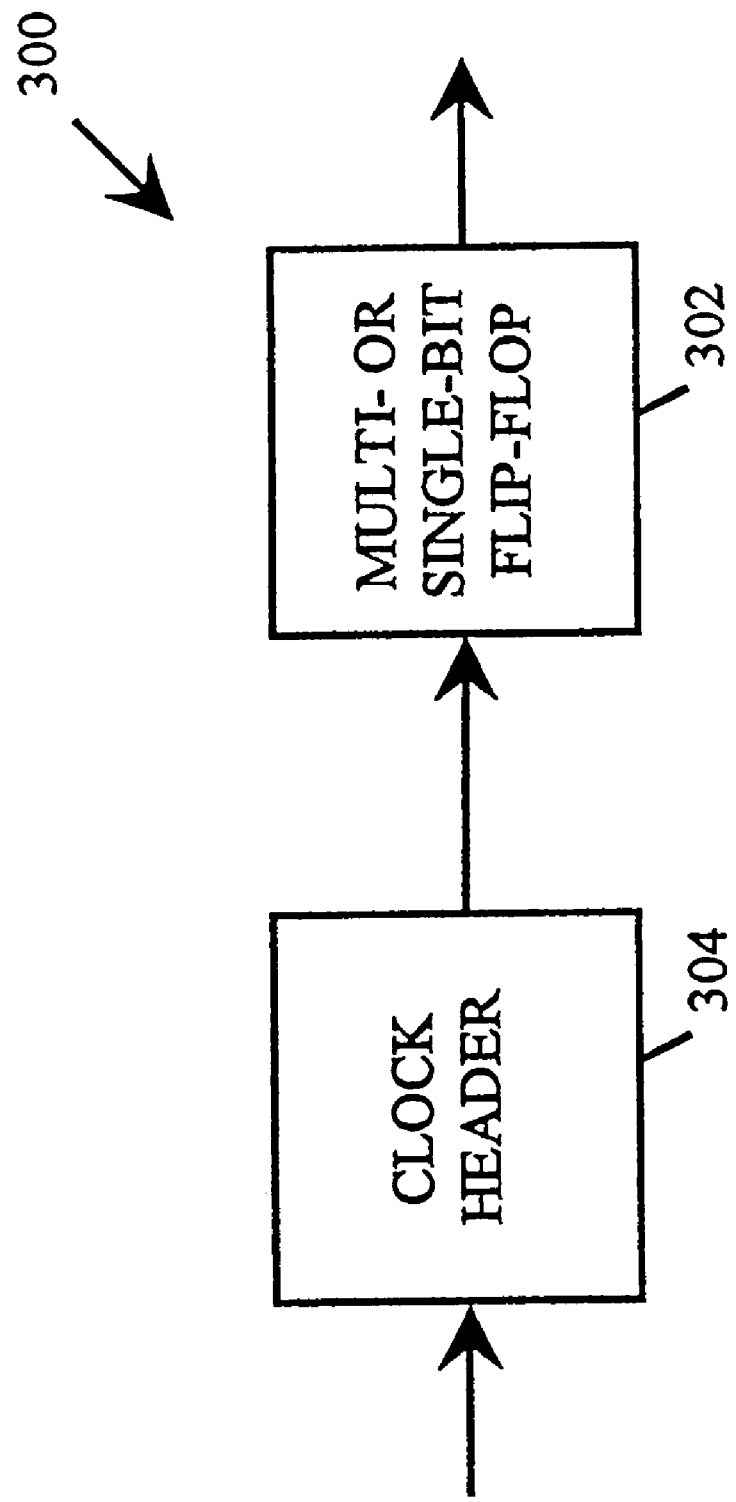
FIG. 3 is a schematic circuit diagram illustrating functional elements of a pulse-based high-speed flip-flop in accordance with an embodiment of the present invention.

Referring to FIG. 3, a schematic block diagram that depicts functional elements of a multiple-bit pulse-based high-speed flip-flop 300. The multiple-bit pulse-based high-speed flip-flop 300 includes a flop circuit 302 and a clock header circuit 304. The flop circuit 302 includes circuit elements for storage and drive functionality. The clock header circuit 304 supplies synchronized clock and inverted clock signals to drive the flop circuit 302.

The multiple-bit pulse-based high-speed flip-flop 300 is most suitably used as an edge-triggered flip-flop that can be configured to trigger on either the positive edge or the negative edge. The flop circuit 302 includes a plurality of static memory elements and samples data in a short-duration time window to attain edge-triggered functionality for one thread of a plurality of threads. The static memory elements in the flop circuit 302 are outside the path of data flow, differing from the memory element in conventional flip-flops. The conventional flip-flop design disadvantageously slows propagation of the data signal, reducing the time for data computation each timing cycle, and reducing overall system speed.

The multiple-bit pulse-based high-speed flip-flop 300 advantageously has the storage elements positioned outside the direct data flow path so that signal speed is not reduced.

Figure 4:
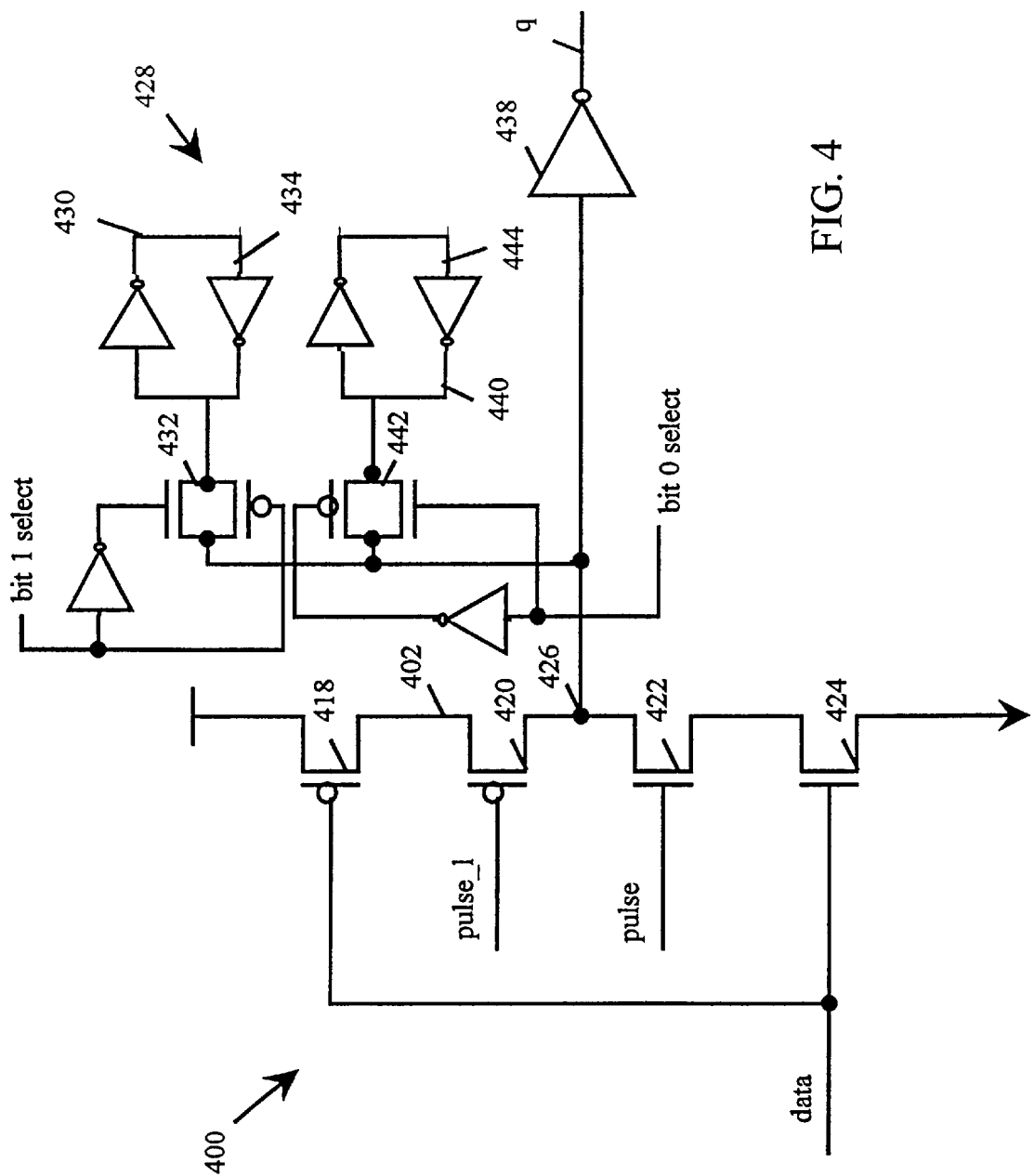
FIG. 4 is a schematic circuit diagram that shows an embodiment of a multiple-bit pulsed flop circuit that is suitable for usage in the multiple-bit pulse-based high-speed flip-flop shown in FIG. 3.

Referring to FIG. 4, a schematic circuit diagram shows a multiple-bit pulsed flop circuit 400 that is suitable for usage in the pulse-based high-speed flip-flop 300 shown in FIG. 3. The pulsed flop circuit 400 includes a push-pull gate driver 402 that operates as a push-pull circuit for driving short-duration pulses to a multiple-bit storage element 428 and a timing signal output line q via an inverter 438. A plurality of individual bits of the multiple-bit storage element 428 also have a storage output line for passing data stored in the particular bit of the multiple-bit storage element 428.

The push-pull gate driver 402 has four MOSFETs connected in series in a source-drain pathway between VDD and VSS references including p-channel MOSFETs 418 and 420 and n-channel MOSFETs 422 and 424. P-channel MOSFET 418 and n-channel MOSFET 424 have gate terminals connected to a data signal line data. P-channel MOSFET 420 has a source-drain pathway connected between the p-channel MOSFET 418 and node 426, and has a gate terminal connected to an inverse pulse signal pulse_l. N-channel MOSFET 422 has a source-drain pathway connected between the node 426 and N-channel MOSFET 424, and has a gate terminal connected to a pulse signal pulse.

When the inverse pulse signal pulse_l and the data signal data are simultaneously low, the node 426 is brought high by the p-channel MOSFETs 418 and 420. When the clock signal on pulse and the data signal data are simultaneously high, the node 426 is brought low by the n-channel MOSFETs 422 and 424.

When the pulse signals pulse and pulse_l are asserted, the node 426 holds a value that is the inverse of the data signal on line data. Driving strengths of the transistors 418, 420, 422, and 424 are selected for functionality during data sampling and propagation delay.

The multiple-bit pulsed flop circuit 400 includes two or more storage cells. In the illustrative example, the circuit includes two storage cells 430 and 440, respectively including static memory elements or latchs 434 and 444. When the pulse signals pulse and pulse_1 are asserted, the inverse of the data signal on line data is latched by one of the storage cells 430 or 440 determined by a select bus signal. Additional storage cells may be included in other embodiments to further expand the number of execution threads that can be held in a multiple-thread processor at one time. Depending on operating characteristics of the processor, more than one thread may be stalled at one time. A capability to hold many threads in a pipeline is advantageous when multiple threads may be stalled simultaneously.

The multiple-bit pulsed flop circuit 400 includes a bit storage select switch that selects which bit storage is currently active. In the example, the bit storage select switch includes separate switches 432 and 442 for the individual bit storages. In the example, the switches 432 and 442 include a p-channel MOSFET and an n-channel MOSFET connected in parallel and an inverter connected to the gate of one transistor of the n-channel MOSFET. The gates of the p-channel MOSFET and the n-channel MOSFET are driven by the bit select signal. For example, switch 432 is controlled by bit 1 select of the select bus, and switch 442 is controlled by bit 0 select of the select bus.

The multiple-bit pulsed flop circuit 400 uses a simple latch structure that stores data received from an input line that is activated for a small pulse time duration. The select bus signal determines which bit of the multiple-bit pulsed flop circuit 400 is active. At any time, at most one bit is active and holds or drives an output signal on bit1 or bit0 output lines. When the select bus signal changes and the active bit is swapped with an inactive bit, the output signal changes accordingly.

Transistor drive strengths are selected for functionality during external data sampling, data propagation, and thread switching. Those having ordinary skill in the electronics arts know selection of transistor drive strengths for a particular application and circuit implementation.

The storage cells 430 and 440 are connected to the node 426 and thus connected to the data path from the node 426 to an output line q, but are not inserted into the data path between the node 426 and the output line q. Specifically, a single line forms the input terminal and the output terminal to the storage cells 430 and 440 so that the storage cells 430 and 440 do not interpose a delay between the node 426 and inverter 438. The connection of the storage cell 430 outside the path of data flow prevents delay of the data signal, increasing the rate of propagation of the data signal. The resulting improvement in data transmission rate increases the amount of time available for signal computation in a computing system, improving system operating speed. In contrast, a conventional pipeline generally contains conventional storage elements or latches that are located in the path of data flow, slowing the propagation of a signal and reducing the time for signal computation in a processor, resulting in a reduction is processor execution speed.

The multiple-bit pulsed flop circuit 400, by having storage elements outside the data path, has an improved operating speed due to reduced setup time. Setup time is zero or almost zero because data is connected directly to sampling devices. The multiple-bit pulsed flop circuit 400 thus decreases setup time and propagation time. However, data must be held stable during the clock pulse to prevent incorrect data from propagation, thereby increasing hold time. Accordingly, the multiple-bit pulsed flop circuit 400 eliminates timing penalty at the cost of increasing hold time.

Figure 5:
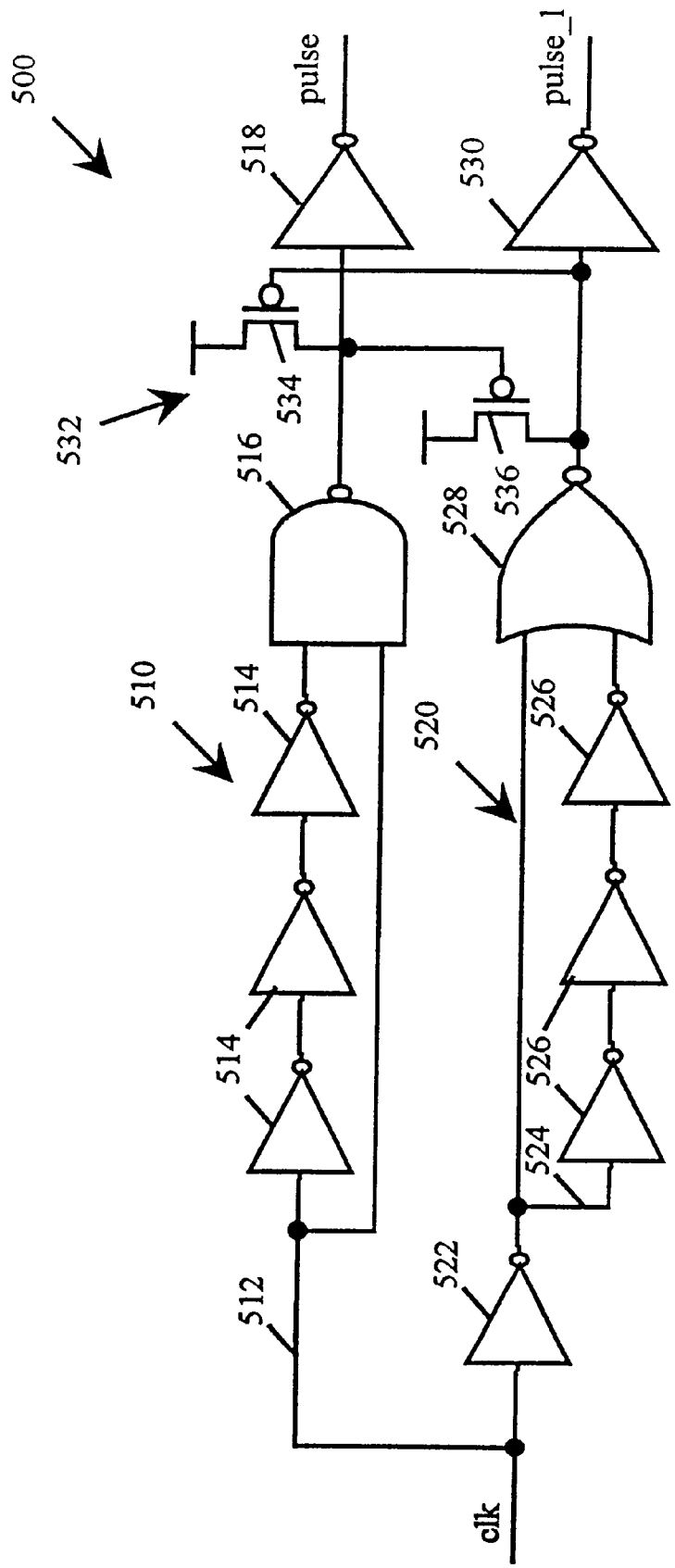
FIG. 5 is a schematic circuit diagram that depicts an example of a timing circuit that is suitable for usage in the pulse-based high-speed flip-flop shown in FIG. 3.

Referring to FIG. 5, a schematic circuit diagram depicts an example of a timing circuit 500 that is suitable for usage as the clock header circuit 304 shown in FIG. 3. The timing circuit 500 forms a pulse signal from a clock timing signal on a signal line clk. The timing circuit 500 forms the pulse signals pulse and pulse_1 by passing the clock signal on clock line clk through two delay lines including a pulse clock delay line 510 and an inverse pulse delay line 520. The illustrative pulse clock delay line 510 includes a delay string 512 including a plurality of inverters 514, a NAND gate 516 and an end inverter 518. The illustrative inverse pulse delay line 520 includes a beginning inverter 522, a delay string 524 including a plurality of inverters 526, a NOR gate 528 and an end inverter 530. The number of inverters 514 and the number of inverters 526, respectively determine duration of the pulse and inverted pulse. Illustratively and typically, the number of inverters 514 in the pulse delay line 510 is equal to the number of inverters 526 in the inverse pulse delay line 520 so that the pulse and inverted pulse have the same duration. In other embodiments, the pulse duration of the pulse and inverted pulse may be made equal by techniques other than duplicating the implementation of an inverter string. Although the delay strings 512 and 524 each are shown to include three inverters, in other embodiments fewer or more inverters may be used.

The timing circuit 500 includes a synchronization circuit 532 connected to output terminals of the NAND gate 516 and the NOR gate 528 to synchronize the pulse signal on the pulse line pulse and the inverted pulse signal on the inverted pulse line pulse_1. In the illustrative example, the synchronization circuit 532 includes P-channel MOSFETs 534 and 536. P-channel MOSFET 534 has a source-drain pathway coupled between a VDD reference and a connection to the output terminal of NAND gate 516 and a gate terminal connected to the output terminal of NOR gate 528. P-channel MOSFET 536 has a source-drain pathway coupled between a VDD reference and a connection to the output terminal of NOR gate 528 and a gate terminal connected to the output terminal of NAND gate 516.

Figure 6:
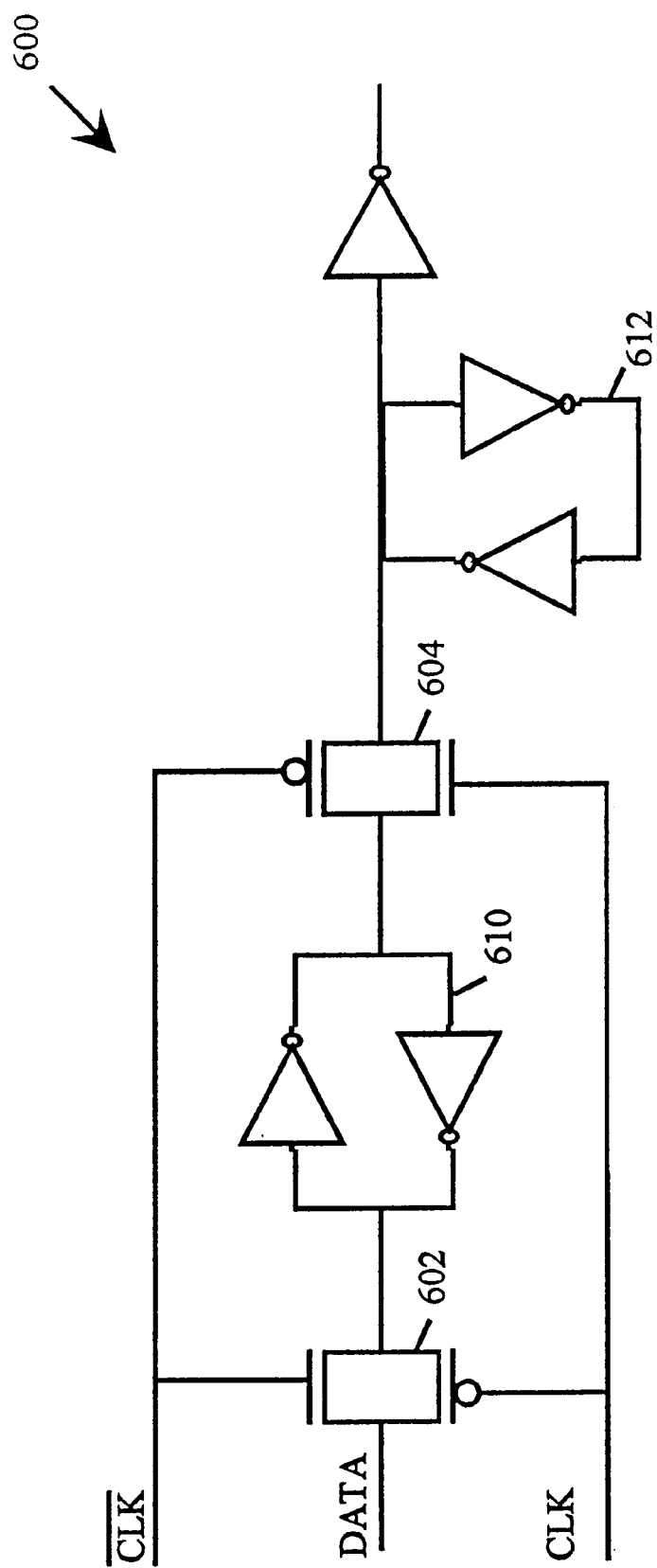
FIG. 6 is a highly schematic circuit diagram depicting a master/slave flip-flop having a setup time $T_s$ that slows speed operation due to imposition of delay in the data path.
Figure 7:
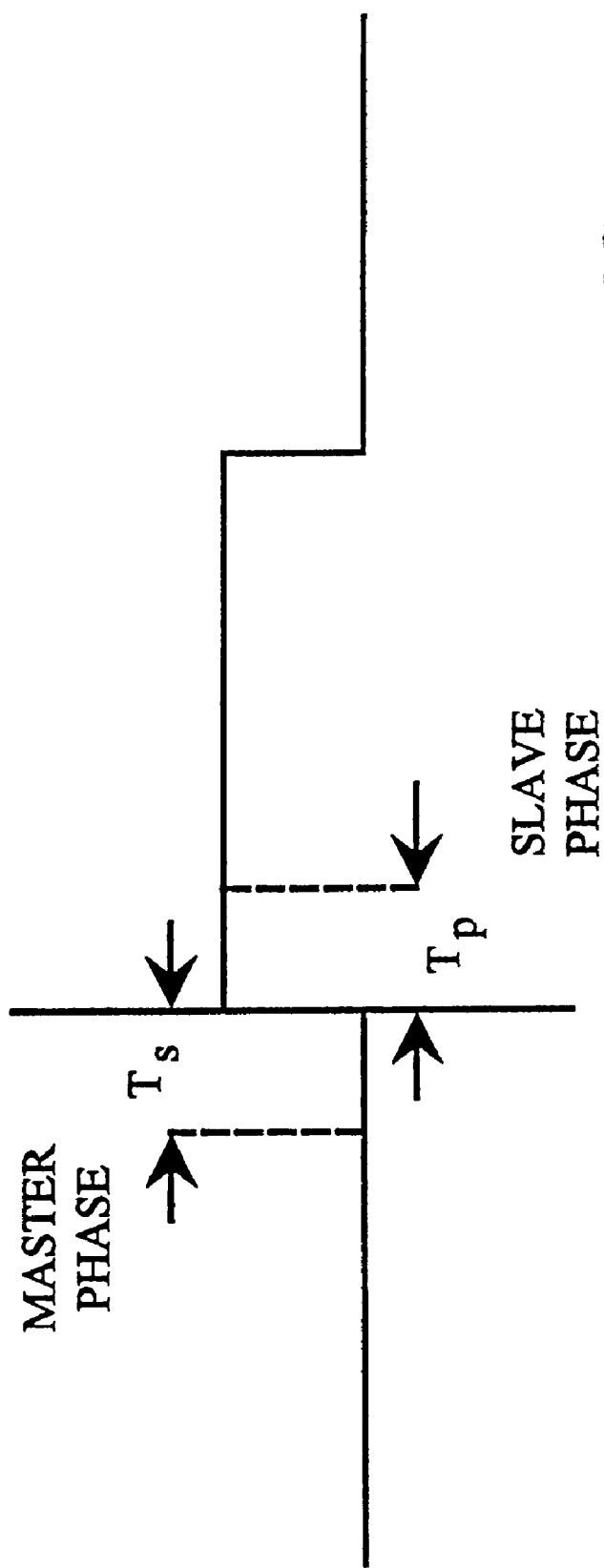
FIG. 7 is a timing diagram that illustrates timing operation of the master/slave flip-flop shown in FIG. 6.

The improvement in operating speed that is achieved by the multiple-bit pulse-based high-speed flip-flop 300 is illustrated by comparison with a typical master/slave flip-flop. Referring to FIG. 6, a highly schematic circuit diagram depicts a master/slave flip-flop 600 having a setup time $T_s$ that slows speed operation due to imposition of delay in the data path. The master/slave flip-flop 600 includes switches 602 and 604 for first storing data in a master storage cell 610 in a master timing phase, then storing the data in a slave storage cell 612 in a slave timing phase. During the setup time $T_s$ shown in a timing diagram in FIG. 7, data passes through and is held in the master storage cell 610. During the propagation time $T_p$, data passes through and is held in the slave storage cell 612. Both the setup time $T_s$ and the propagation time $T_p$ have a duration of one and one-half to two gate delays, reducing operating speed of the circuit.

Figure 8:
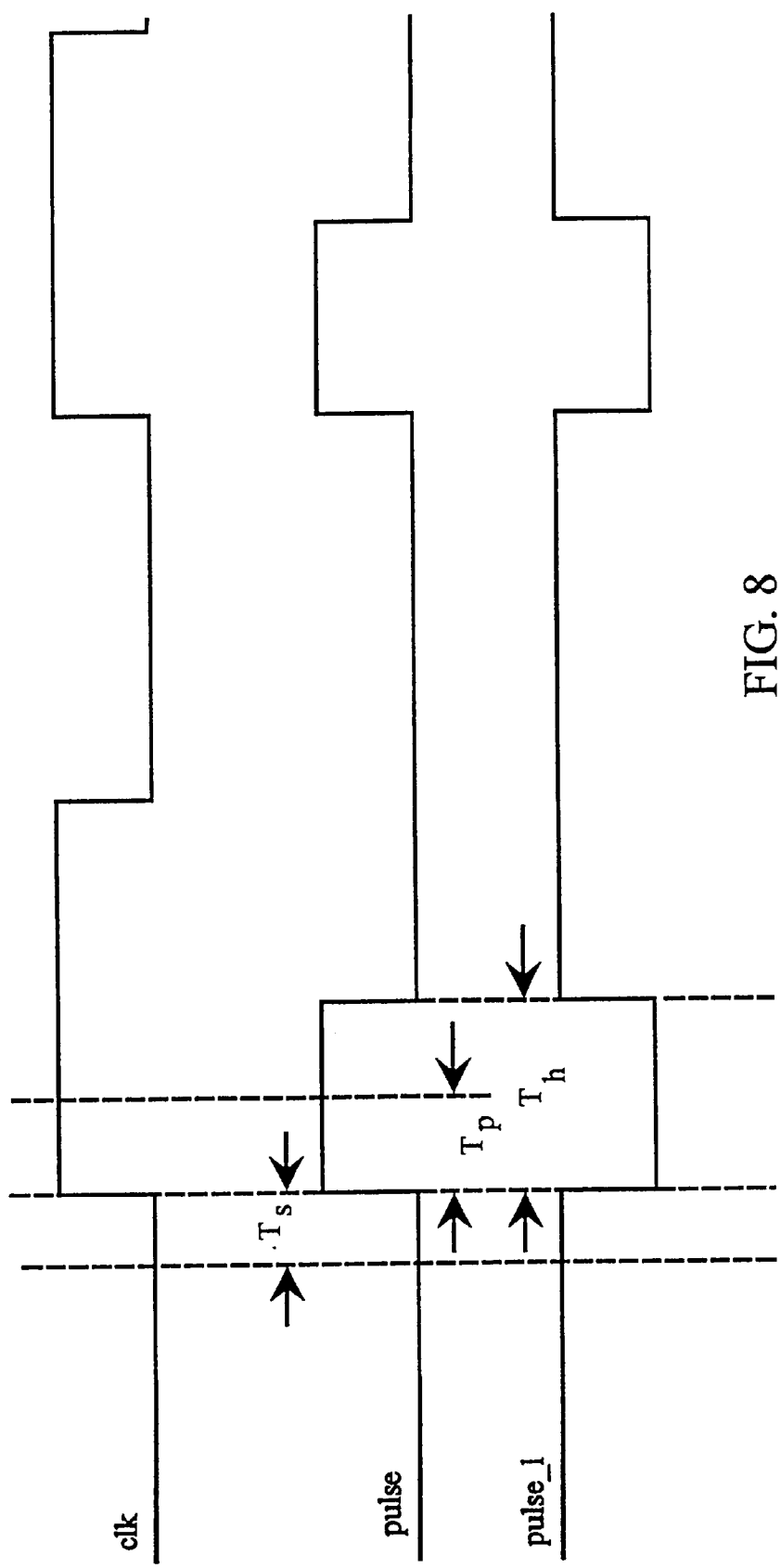
FIG. 8 is a timing diagram illustrating pulsed operation of the multiple-bit pulse-based high-speed flip-flop.

The multiple-bit pulse-based high-speed flip-flop 300 forms a pulsed data signal. The input data is sampled only for a relatively short time interval during which the input data is valid and stable. Referring to FIG. 8 a timing diagram illustrates the pulsed operation of the multiple-bit pulse-based high-speed flip-flop 300 in which the data input signal is sampled only during a hold time $T_H$ when the data is valid and stable.

Figure 9:
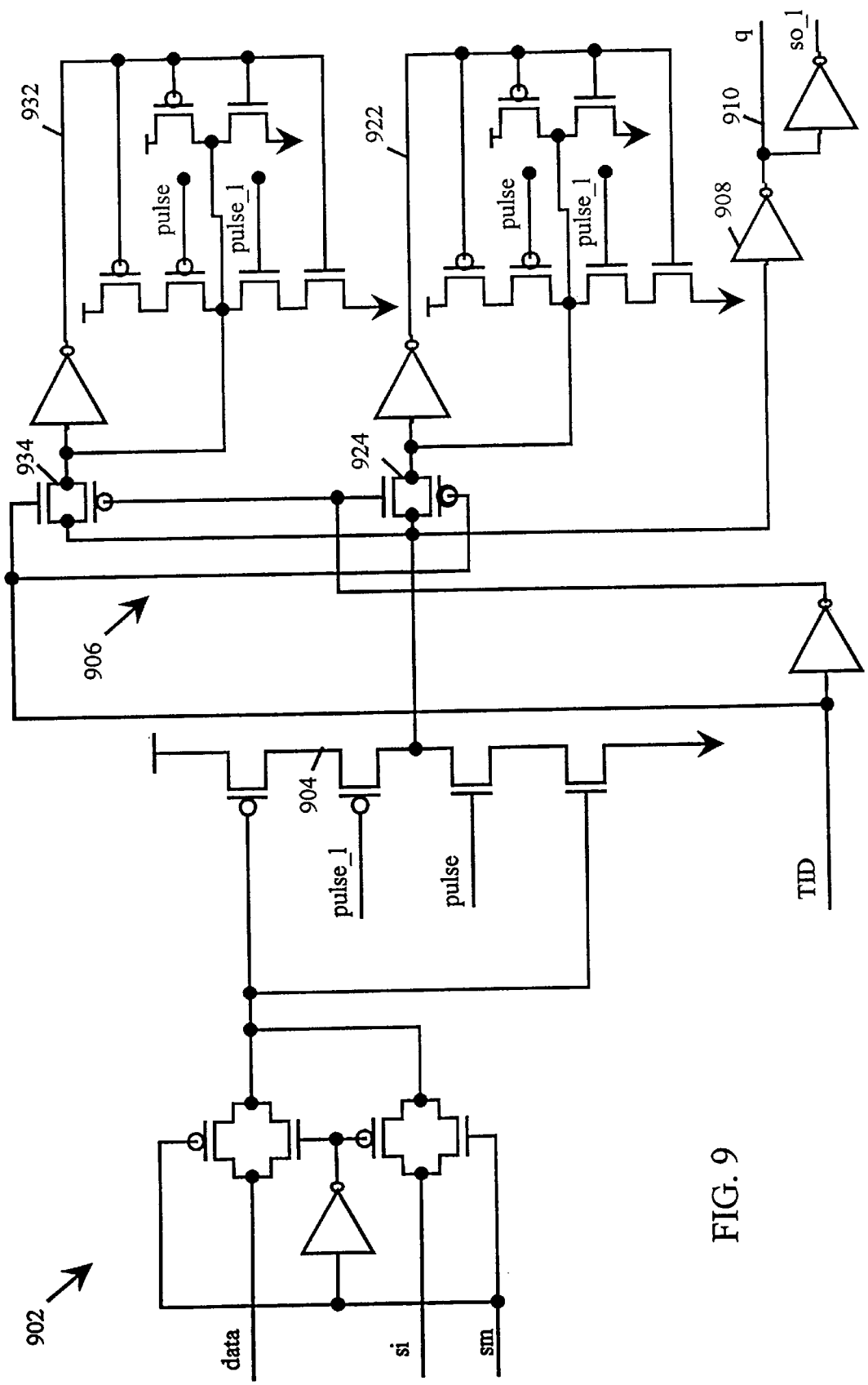
FIG. 9 is a schematic circuit diagram showing an alternative embodiment of a multiple-bit pulsed flop circuit that is suitable for usage in the multiple-bit pulse-based high-speed flip-flop.

Referring to FIG. 9, a schematic circuit diagram shows an alternative embodiment of a multiple-bit pulsed flop circuit 902 that is suitable for usage in the multiple-bit pulse-based high-speed flip-flop 300 shown in FIG. 3. The multiple-bit pulsed flop circuit 902 includes a driver 904 that drives short-duration pulses to a multiple-bit storage element 906 and an output line 910 via an inverter 908. The illustrative multiple-bit storage element 906 includes a bit0 storage element 922 and a bit1 storage element 932. A thread identifier TID signal is connected to activation switches 924 and 934 that respectively selected between the bit0 storage element 922 and the bit1 storage element 932.

Figure 10:
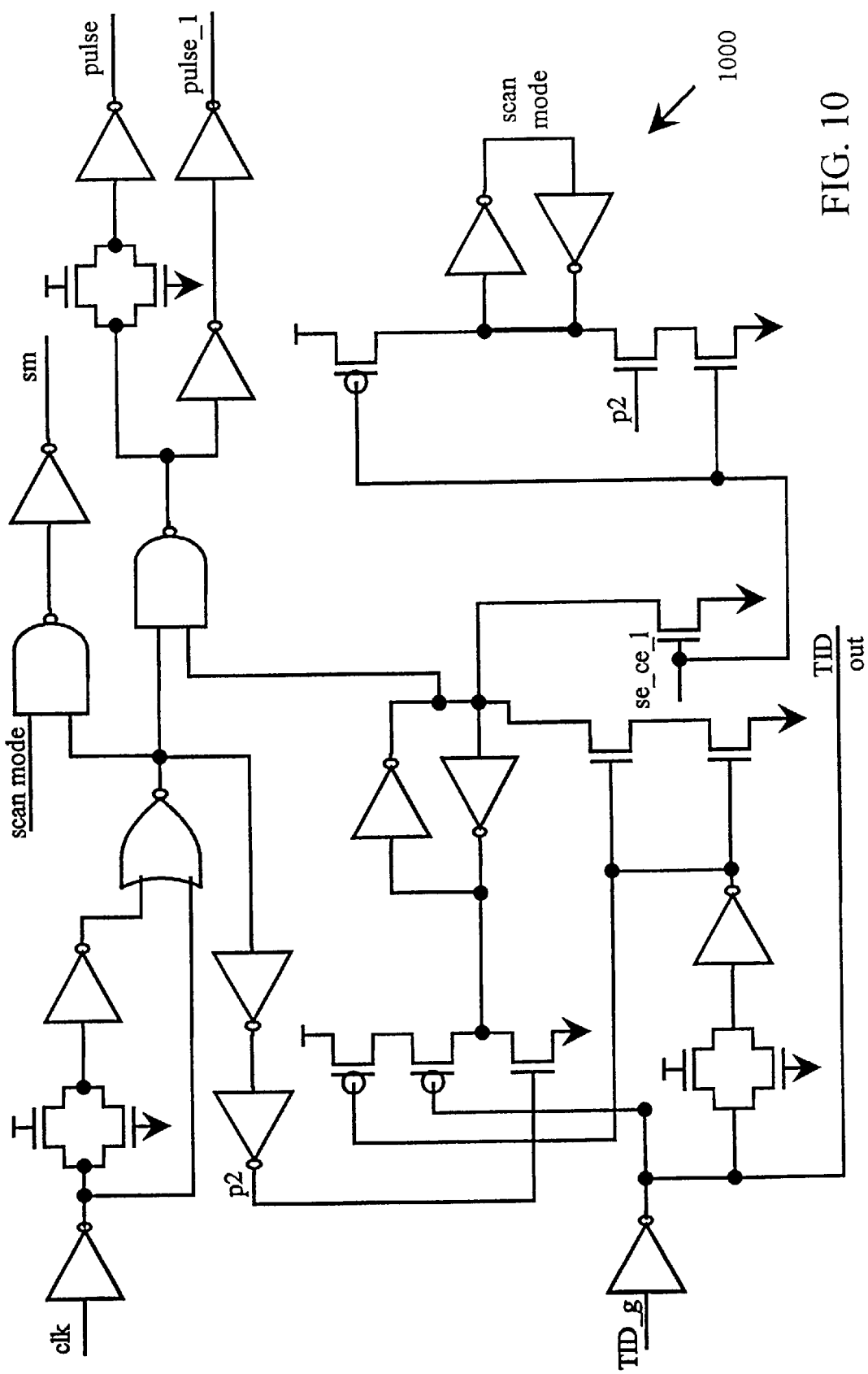
FIG. 10 is a schematic circuit diagram that illustrates an alternative embodiment of a timing circuit that is suitable for usage in the multiple-bit pulse-based high-speed flip-flop.

Referring to FIG. 10, a schematic circuit diagram illustrates an alternative embodiment of a timing circuit 1000 that is suitable for usage in the multiple-bit pulsed flop circuit 902 or other suitable implementation of multiple-bit pulse-based high-speed flip-flop 300.

Figure 11A:
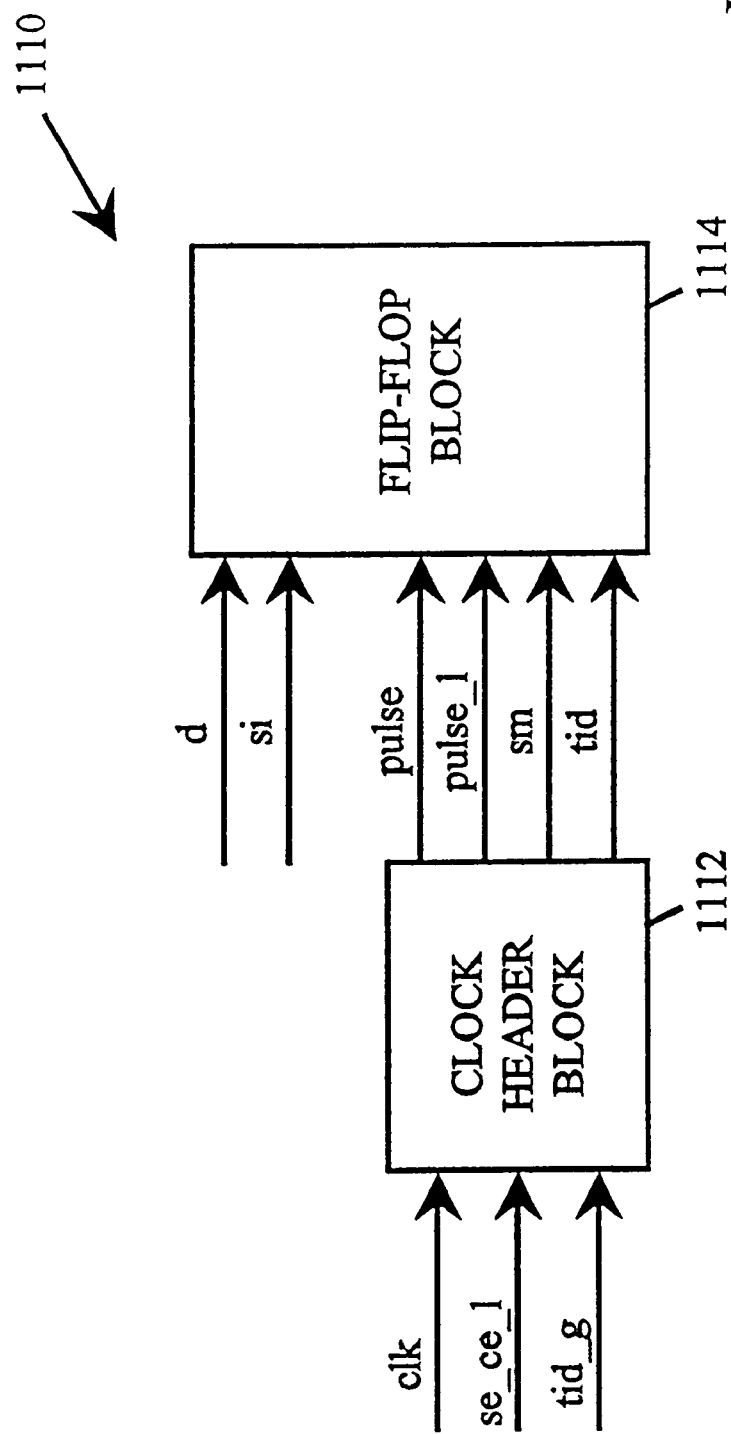
FIGS. 11A, 11B, 11C, and 11D are diagrams showing an embodiment of a pulse-based high-speed flip-flop that is advantageously used to attain multithreading in an integrated circuit.

Referring to FIG. 11A, a schematic block diagram illustrates control and storage blocks of a circuit employing high-speed multiple-bit flip-flops. A multiple-bit flip-flop storage block 1110 includes a clock header block 1112 and a multiple-bit flip-flop block 1114. The clock header block 1112 supplies timing signals and thread select signals to the multiple-bit flip-flop block 1114. Input signals to the clock header block 1112 include a clock signal 14clk that is supplied from external to the multiple-bit flip-flop storage block 1110, a combined scan enable and clock enable signal se__ce__l, and a thread identifier (TID) signal tid__g that is supplied from thread select circuitry external to the multiple-bit flip-flop storage block 1110. The clock header block 1112 derives an internal flip-flop pulse signal pulse, the inverse of the internal flip-flop pulse signal pulse$_{13}$ l, and a scan select signal sm from the external clock 14clk and the scan enable and clock enable signal se$_{13}$ ce__l. The clock header block 1112 asserts an internal thread ID signal tid based on the thread identifier (TID) signal tid__g. The clock header block 1112 drives one or more flip-flop cells in the multiple-bit flip-flop block 1114. Typically, the multiple-bit flip-flop block 1114 includes from one to 32 bistable multivibrator cells, although more cells may be used. The internal flip-flop pulse signal pulse, the inverse of the internal flip-flop pulse signal pulse__l, the scan select signal sm, and the internal thread ID signal tid are supplied from the clock header block 1112 to the multiple-bit flip-flop block 1114.

In addition to the internal flip-flop pulse signal pulse, the inverse of the internal flip-flop pulse signal pulse__l, the scan select signal sm, and the internal thread ID signal tid, the multiple-bit flip-flop block 1114 also receives an input data signal d and a scan chain input signal si.

Figure 11B:
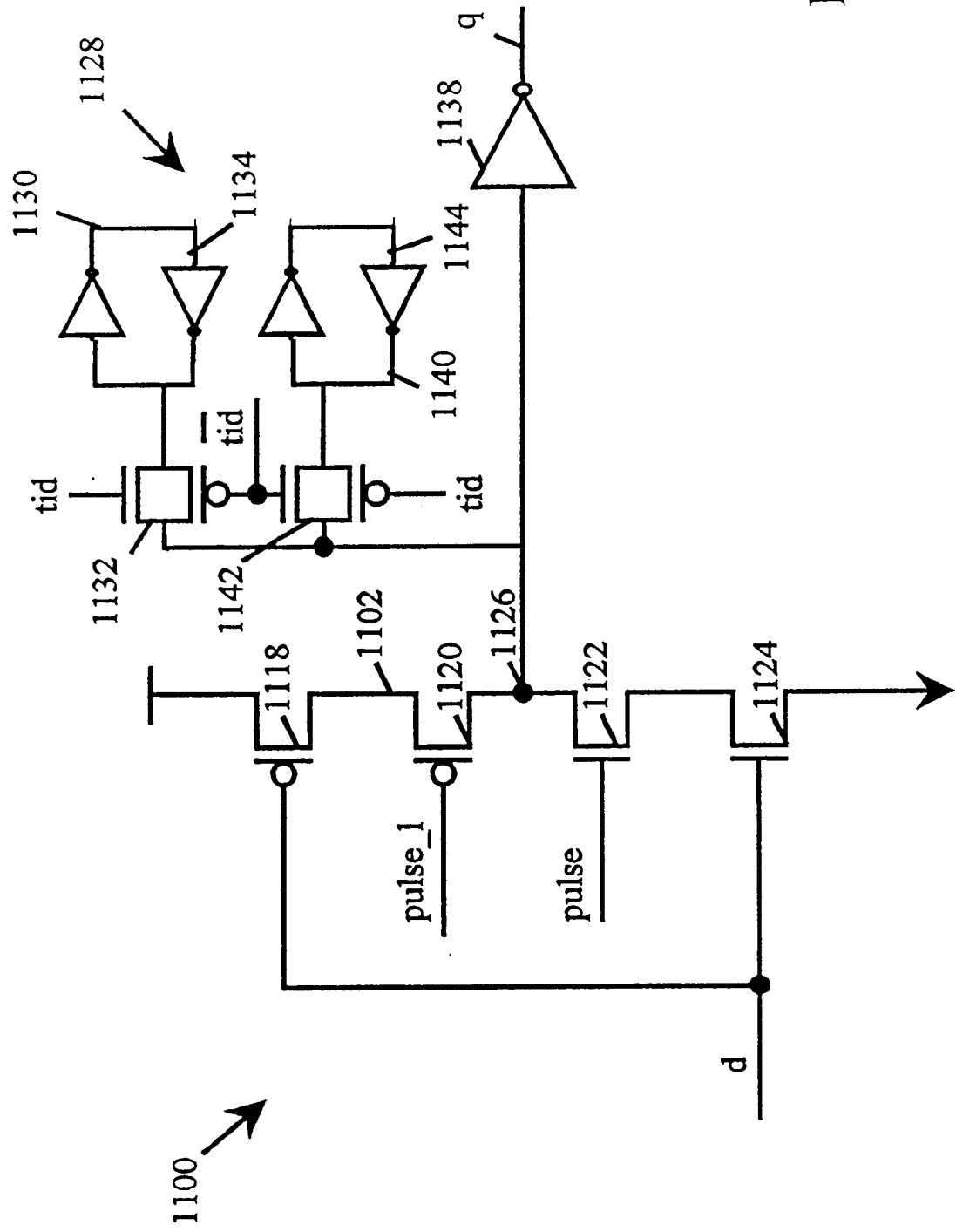

Referring to FIG. 11B, a schematic circuit diagram shows a multiple-bit bistable multivibrator (flip-flop) circuit. A conventional flip-flop is a single-bit storage structure and is commonly used to reliably sample and store data. A flip-flop is typically a fundamental component of a semiconductor chip with a single phase clock and a major determinant of the overall clocking speed of a microcontroller or microprocessor. A novel pulse-based multiple-bit high-speed flip-flop 1100 is used to accelerate the functionality and performance of a processor.

An individual cell of the pulse-based multiple-bit high-speed flip-flop 1100 includes an input stage with a push-pull gate driver 1102. The push-pull gate driver 1102 operates as a push-pull circuit for driving short-duration pulses to a multiple-bit storage circuit 1128 and an output line q via an inverter 1138. The push-pull gate driver 1102 has four MOSFETs connected in series in a source-drain pathway between VDD and VSS references including a p-channel MOSFET 1118, a p-channel MOSFET 1120, an n-channel MOSFET 1122, and an n-channel MOSFET 1124. P-channel MOSFET 1118 and n-channel MOSFET 1124 have gate terminals connected to the input signal d. The p-channel MOSFET 1120 has a source-drain pathway connected between the p-channel MOSFET 1118 and node 1126, and has a gate terminal connected to the inverse of the internal flip-flop pulse signal pulse__l. The n-channel MOSFET 1122 has a source-drain pathway connected between the node 1126 and the n-channel MOSFET 1124 and a gate terminal connected to the internal flip-flop pulse signal pulse. When the inverse pulse signal pulse__l and the input signal d are simultaneously low, the node 1126 is brought high by the p-channel MOSFET 1118 and the p-channel MOSFET 1120. When the internal flip-flop pulse signal pulse and the input signal d are simultaneously high, the node 1126 is brought low by the n-channel MOSFET 1124 and n-channel MOSFET 1122. When pulse signal pulse and pulse__l are asserted, the node 1126 holds a value that is the inverse of the input signal d. Driving strengths of the transistors 1118, 1120, 1122, and 1124 are selected for different functionality during various conditions such as data sampling and propagation, thread switching, and scanning.

The illustrative multiple-bit storage circuit 1128 includes two storage cells 1130 and 1140, although other embodiments may include a single storage cell or more storage cells. A storage cell 1130 or 1140 includes a switch 1132 or 1142, respectively, and a static memory element or latch 1134 or 1144, respectively. The switch is used to select a particular latch according to the thread identifier (TID) that is active during a short-duration clock pulse. When the internal flip-flop pulse signal pulse is asserted, the inverse of the input signal d is latched by the storage cell 1130 or 1140 that is selected by the thread identifier (TID). In the illustrative system, the storage cell 1130 is latched when the TID value is 0 so that the memory element 1134 holds the inverse of the input signal d. Similarly, the storage cell 1140 is latched the value of input signal d when the TID value is 1. Other embodiments of a pulse-based multiple-bit high-speed flip-flop 1100 may be utilized that include additional storage cells, for example using a multiple-bit TID and a plurality of switches, multiplexer, or other functionally equivalent switch to select between storage cells.

The multiple-bit storage circuit 1128 is connected to the node 1126 and thus connected to the data path from the node 1126 to the output line q, but is not inserted into the data path between the node 1126 and the output line q. Specifically, a single line forms the input terminal and the output terminal to the storage cells 1130 and 1140 so that the multiple-bit storage circuit 1128 does not interpose a delay between the node 1126 and the inverter 1138. The connection of the multiple-bit storage circuit 1128 outside the path of data flow prevents delay of the data signal, increasing the rate of propagation of the data signal. The resulting improvement in data transmission rate increases the amount of time available for signal computation in a computing system, improving system operating speed. In contrast, a conventional pipeline generally contains conventional storage elements or latches that are located in the path of data flow, slowing the propagation of a signal and reducing the time for signal computation in a processor, resulting in a reduction is processor execution speed.

The short-duration pulse at the node 1126 controls data storage in the static memory element or latch 1134, 1144 selected by the TID. Driver 1102 in conjunction with the short duration of pulse and pulse__l applying data to the latches 1134 and 1144 in the storage cell produce an edge-triggered flip-flop functionality. The multiple-bit pulse-based high-speed flip-flop 1100 is connected to a thread select line to determine which bit is active of a plurality of bits. At any one time only a single bit is active and the active bit holds and drives an output signal on an output line q via the inverter 1138. When the active bit is switched with one of the inactive bits, the output signal of the latch 1134 or 1144 changes accordingly.

Figure 11C:
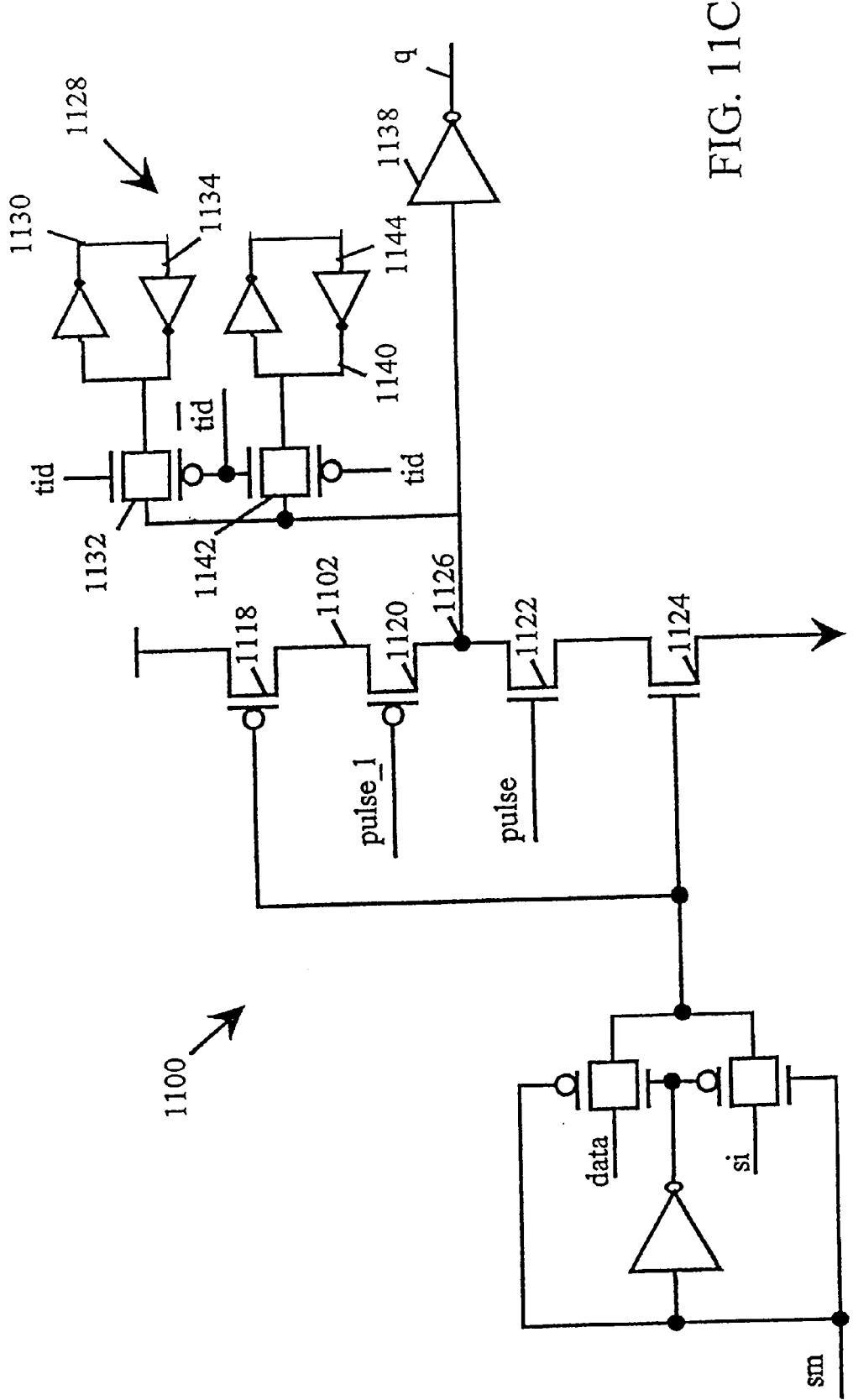

Bits of the pulse-based high-speed flip-flop 1100 may be made scannable. FIG. 11C depicts an alternative embodiment of a pulse-based high-speed flip-flop 1150 which is scannable.

In one example, the high-speed flip-flop 1100 is a master-slave flip-flop that replaces a single-bit master-slave flip-flop. Other types of flip-flops, which are well known to those having ordinary skill in the electronics arts, may be converted to multiple-bit flip-flops for usage in a multi-threaded processor.

Figure 11D:
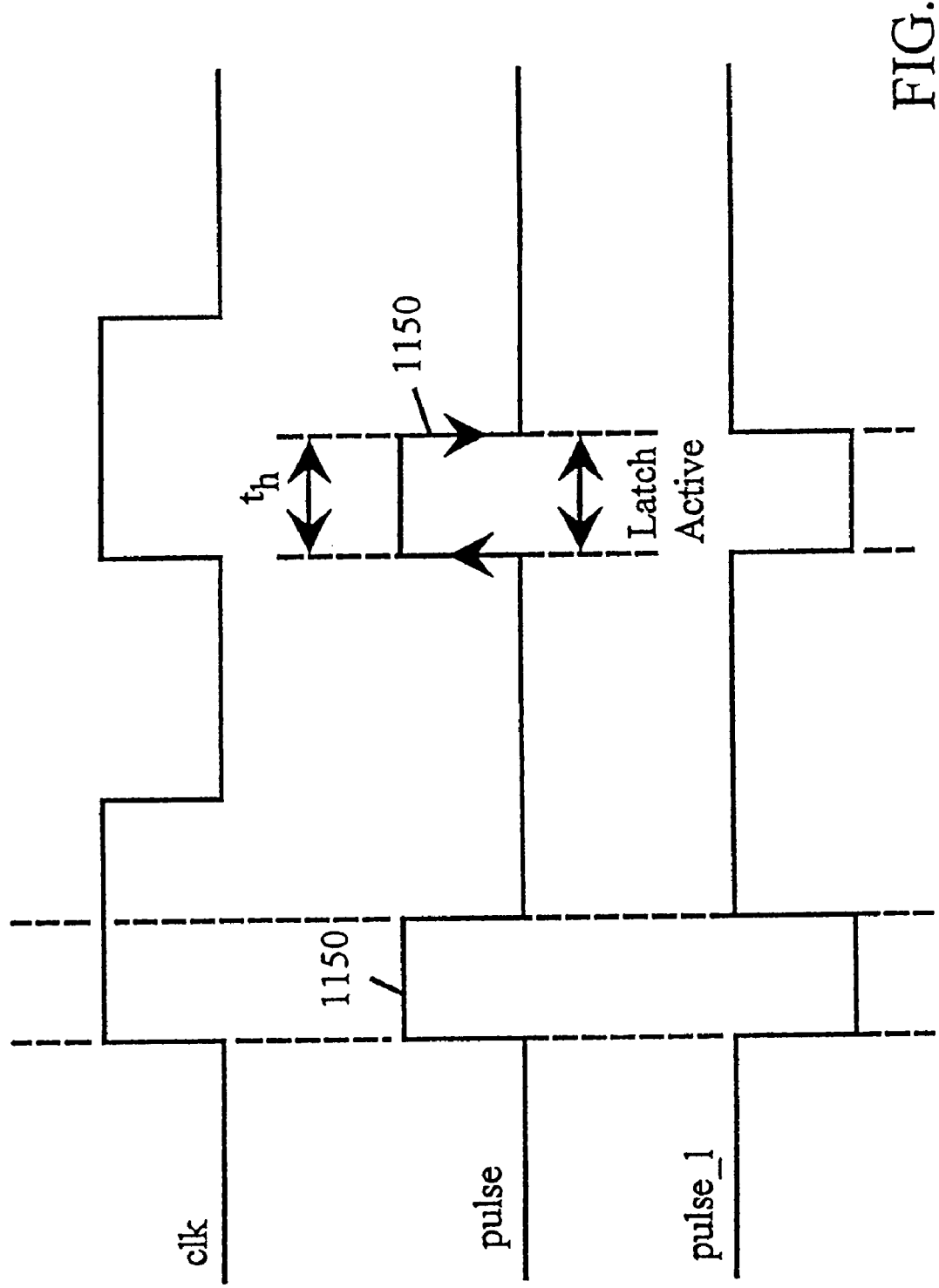

Referring to FIG. 11D, a timing diagram illustrates timing of the multiple-bit flip-flop 1100. The clock/control header circuit produces pulse and pulse_l signals with reference to clk signal. Data d determines the output level on output line q when pulse goes HIGH and pulse_l goes LOW. During the pulse and pulse_l signals, the inverse of the input signal d is latched onto the storage cell 1130 or the storage cell 1140 as determined by the thread identifier (TID). The flip-flop 1100 samples the signal in a small time-duration window to produce an edge-trigger functionality.

During the pulse and pulse_l signal, the internal node 1126 holds the inverse value of data d. When pulse and pulse_l are no longer asserted, the signal at the node 1126 is determined by the storage cells 1130 and 1140, determined by the TID control signal.

In the illustrative pulse-based high-speed flip-flop 1100, the latches 1134 and 1144 are advantageously removed from the direct path of signal propagation and thus do not degrade signal speed. The pulse-based high-speed flip-flop 1100 has a zero or very small setup time but a relatively long hold time.

In contrast, a conventional flip-flop may include a storage element that is in the path of data flow, slowing propagation of the signal and shortening the time duration that is left for signal computation, thereby reducing system operating speed. The described flip-flop 1100 includes a storage element that is not in the direct path of signal propagation and does not hinder system operating speed.

While the invention has been described with reference to various embodiments, it will be understood that these embodiments are illustrative and that the scope of the invention is not limited to them. Many variations, modifications, additions and improvements of the embodiments described are possible. For example, those skilled in the art will readily implement the steps necessary to provide the structures and methods disclosed herein, and will understand that the process parameters, materials, and dimensions are given by way of example only and can be varied to achieve the desired structure as well as modifications which are within the scope of the invention. Variations and modifications of the embodiments disclosed herein may be made based on the description set forth herein, without departing from the scope and spirit of the invention as set forth in the following claims. For example, although the illustrative processors include a specified number of threads per pipeline and a specified number of pipelines per integrated circuit chip, various other numbers of threads and pipelines may be implemented in other examples, depending on desired processor applications, semiconductor fabrication techniques, and various size parameters of the processor.

The descriptions contained herein relate to many aspects of processor structure and operating techniques, including structural and functional aspects of various processor components. The structures and techniques are described that are highly useful in combination. However, various structures and techniques are also innovative and highly advantageous when employed alone or in multiple various subcombinations. The invention is to be limited by the claims alone and various limitations that are described in the specification but not included in a particular claim are not to be considered inherent to the claim merely by inclusion in the specification.

What is claimed is:

1. A pipeline register for synchronizing data in a data path comprising:
   a driver;
   a plurality of switched storage elements coupled to the driver, the driver for driving a storage element selected by the switch, data in one or more storage elements that are not selected by the switch being held, the plurality of storage elements being coupled to the data path outside the data path; and
   a pulse timing control circuit coupled to the driver and forming from a clock signal a pulse signal and an inverted pulse signal.

2. A pipeline register according to claim 1 further comprising:
   a multiple-bit selection switch coupled to the plurality of switched storage elements, the multiple-bit selection switch capable of selecting one thread for activation among a plurality of simultaneously executing threads.

3. A pipeline register according to claim 1 wherein:
   the pulse signal and inverted pulse signal are synchronized by a mutual control connection.

4. A pipeline register according to claim 1 wherein:
   the pulse timing control circuit includes:
      first and second delay lines that are respectively coupled to first and second logic elements having a first input connection to a signal coupled prior to the delay line and a second input connection to a signal coupled subsequent to the delay line, the first and second logic elements forming mutually inverse output signals.

5. A pipeline register according to claim 1 wherein:
   the pulse timing control circuit includes:
      first and second delay lines that are respectively coupled to first and second logic elements having a first input connection to a signal coupled prior to the delay line and a second input connection to a signal coupled subsequent to the delay line, the first and second logic elements forming mutually inverse output signals; and
      a mutual control interconnection between the mutually inverse output signals that synchronize the mutually inverse output signals.

6. A pipeline register for synchronizing data in a data path comprising:
   a driver; and
   a plurality of switched storage elements coupled to the driver, the driver for driving a storage element selected by the switch, data in one or more storage elements that are not selected by the switch being held, the plurality of storage elements being coupled to the data path outside the data path; wherein:
      the driver is an edge-triggered driver that can be configured to trigger on either the positive edge or the negative edge.

7. A pipeline register according to claim 1 wherein:
   the plurality of storage elements are static memory elements that sample data in a short-duration time window for edge-triggered functionality.

8. A pipeline register for synchronizing data in a data path comprising:
   a driver; and
   a plurality of switched storage elements coupled to the driver, the driver for driving a storage element selected by the switch, data in one or more storage elements that are not selected by the switch being held, the plurality of storage elements being coupled to the data path outside the data path; wherein the driver further comprises:
      a plurality of transistors coupled along a common source-drain pathway, the plurality of transistors including:
         a first pair of complementary transistors each having a gate terminal coupled to a data line; and
         a second pair of complementary transistors, a first transistor of the second pair of complementary transistors having a gate terminal coupled to a pulse signal and a second transistor of the second pair of complementary transistors having a gate terminal coupled to an inverted pulse signal complementary to the pulse signal.

9. A method of operating a pipeline register comprising:
   passing a time pulse;
   sampling data during the time pulse;
   passing the data along a data path;
   selecting a storage element from among a plurality of storage elements, the plurality of storage elements being capable of storing a respective plurality of execution threads; and
   storing the sampled data in a storage element connected to but outside the data path; and
   sampling the data on a positive-edge transition of the pulse.

10. A method According to claim 9 further comprising:
   storing the data into a latch of a storage element selected from among the plurality of storage elements.

11. A method According to claim 9 further comprising:
   sampling the data with a zero setup time.

12. A method of operating a pipeline register comprising:
   passing a time pulse;
   sampling data during the time pulse;
   passing the data along a data path;
   selecting a storage element from among a plurality of storage elements, the plurality of storage elements being capable of storing a respective plurality of execution threads; and
   storing the sampled data in a storage element connected to but outside the data path; and
   sampling the data on a negative-edge transition of the pulse.

13. An integrated circuit device for synchronization of data in a data path comprising:
   means for passing a time pulse;
   means for sampling data during the time pulse;
   means for passing the data along a data path;
   means for selecting a storage element from among a plurality of storage elements, the plurality of storage elements being capable of storing a respective plurality of execution threads;
   means for storing the sampled data in a storage element connected to but outside the data path; and
   means for sampling the data on an edge transition of the pulse.

14. A processor comprising:
   a control logic for executing computational and logic operations; and
   a memory coupled to the control logic, the control logic and the memory including a plurality of pipeline registers for synchronizing data in a data path comprising:
      a driver;
      a plurality of switched storage elements coupled to the driver, the driver for driving a storage element selected by the switch, data in one or more storage elements that are not selected by the switch being held, the plurality of storage elements being coupled to the data path outside the data path; and
      a pulse timing control circuit coupled to the driver and forming from a clock signal a pulse signal and an inverted pulse signal.

15. A processor according to claim 14 wherein:
   the pulse signal and inverted pulse signal being synchronized by a mutual control connection.

16. A processor according to claim 14 wherein:
   the pulse timing control circuit including:
      first and second delay lines that are respectively coupled to first and second logic elements having a first input connection to a signal coupled prior to the delay line and a second input connection to a signal coupled subsequent to the delay line, the first and second logic elements forming mutually inverse output signals.

17. A processor according to claim 14 wherein:
   the pulse timing control circuit includes:
      first and second delay lines that are respectively coupled to first and second logic elements having a first input connection to a signal coupled prior to the delay line and a second input connection to a signal coupled subsequent to the delay line, the first and second logic elements forming mutually inverse output signals; and
      a mutual control interconnection between the mutually inverse output signals that synchronize the mutually inverse output signals.

18. A processor comprising:
   a control logic for executing computational and logic operations; and
   a memory coupled to the control logic, the control logic and the memory including a plurality of pipeline registers for synchronizing data in a data path comprising:
      a driver;
      a plurality of switched storage elements coupled to the driver, the driver for driving a storage element selected by the switch, data in one or more storage elements that are not selected by the switch being held, the plurality of storage elements being coupled to the data path outside the data path; wherein:
         the driver is an edge-triggered driver that can be configured to trigger on either the positive edge or the negative edge.

19. A processor according to claim 14 wherein:
   the storage element is a static memory element that samples data in a short-duration time window for edge-triggered functionality.

20. A processor according to claim 14 wherein the driver further comprises:
   a plurality of transistors coupled along a common source-drain pathway, the plurality of transistors including:
      a first pair of complementary transistors each having a gate terminal coupled to a data line; and a second pair of complementary transistors, a first transistor of the second pair of complementary transistors having a gate terminal coupled to a pulse signal and a second transistor of the second pair of complementary transistors having a gate terminal coupled to an inverted pulse signal complementary to the pulse signal.

21. A pipeline register for synchronizing data in a data path comprising:

a driver;

a plurality of switched storage elements coupled to the driver, the driver for driving a storage element selected by the switch, data in one or more storage elements that are not selected by the switch being held, the plurality of storage elements being coupled to the data path outside the data path.

22. A pipeline register according to claim 21 further comprising:

a multiple-bit selection switch coupled to the plurality of switched storage elements, the multiple-bit selection switch capable of selecting one thread for activation among a plurality of simultaneously executing threads.

23. A pipeline register according to claim 21 wherein:

the plurality of storage elements are static memory elements that sample data in a short-duration time window for edge-triggered functionality.

24. A method of operating a pipeline register comprising:

passing a time pulse;

sampling data during the time pulse;

passing the data along a data path;

selecting a storage element from among a plurality of storage elements, the plurality of storage elements being capable of storing a respective plurality of execution threads; and storing the sampled data in a storage element connected to but outside the data path.

25. A method According to claim 24 further comprising:

storing the data into a latch of a storage element selected from among the plurality of storage elements.

26. A method According to claim 24 further comprising:

sampling the data with a zero setup time.

27. A processor comprising:

a control logic for executing computational and logic operations; and a memory coupled to the control logic, the control logic and the memory including a plurality of pipeline registers for synchronizing data in a data path comprising:

a driver;

a plurality of switched storage elements coupled to the driver, the driver for driving a storage element selected by the switch, data in one or more storage elements that are not selected by the switch being held, the plurality of storage elements being coupled to the data path outside the data path.

28. A processor according to claim 27 wherein:

the storage element is a static memory element that samples data in a short-duration time window for edge-triggered functionality.

29. A processor according to claim 27 wherein the driver further comprises:

a plurality of transistors coupled along a common source-drain pathway, the plurality of transistors including:

a first pair of complementary transistors each having a gate terminal coupled to a data line; and a second pair of complementary transistors, a first transistor of the second pair of complementary transistors having a gate terminal coupled to a pulse signal and a second transistor of the second pair of complementary transistors having a gate terminal coupled to an inverted pulse signal complementary to the pulse signal.

\* \* \* \* \*